United States Patent
Wang (10) Patent No.: US 11,297,057 B2
(45) Date of Patent: Apr. 5, 2022

(54) METHODS AND DEVICES FOR AUTHENTICATION

(71) Applicant: Nokia Technologies Oy, Espoo (FI)

(72) Inventor: Zhi Wang, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 234 days.

(21) Appl. No.: 16/468,244

(22) PCT Filed: Nov. 28, 2017

(86) PCT No.: PCT/EP2017/080609
§ 371 (c)(1),
(2) Date: Jun. 10, 2019

(87) PCT Pub. No.: WO2018/108513
PCT Pub. Date: Jun. 21, 2018

(65) Prior Publication Data
US 2020/0084211 A1    Mar. 12, 2020

(30) Foreign Application Priority Data

Dec. 12, 2016    (CN) .......................... 201611141823.1

(51) Int. Cl.
*H04L 29/06*    (2006.01)
*H04W 12/06*    (2021.01)
*H04W 12/69*    (2021.01)

(52) U.S. Cl.
CPC ...... *H04L 63/0884* (2013.01); *H04L 63/0428* (2013.01); *H04L 63/0853* (2013.01);
(Continued)

(58) Field of Classification Search
CPC ............. H04L 63/0884; H04L 63/0428; H04L 63/0853; H04L 63/18; H04L 63/08;
(Continued)

(56) References Cited

U.S. PATENT DOCUMENTS

2010/0115598 A1*  5/2010  Barriga .............. H04L 63/0815
                                                                726/8
2011/0154135 A1*  6/2011  Tyhurst .................... G06F 8/65
                                                                714/57
(Continued)

FOREIGN PATENT DOCUMENTS

CN        101006680 A     7/2007
CN        102171984 B     6/2014
(Continued)

OTHER PUBLICATIONS

International Search Report and Written Opinion received for corresponding Patent Cooperation Treaty Application No. PCT/EP2017/080609, dated Jan. 31, 2018, 9 pages.
(Continued)

*Primary Examiner* — Michael R Vaughan
(74) *Attorney, Agent, or Firm* — Duft & Bornsen, PC (57) ABSTRACT

Embodiments of the present disclosure relate to methods and devices for an authentication of an identity of a user. In example embodiments, the client device reads a digital tag associated with a service to be accessed, the digital tag being encoded with an identifier associated with a service provider that provides the service. The client device then decodes the digital tag to obtain the identifier. Further, the client device determines an authentication proxy associated with the service provider, and sends, to the associated authentication proxy, the identifier and a first request for an authentication of an identity of a user associated with the client device. In this way, the security of the authentication of the identity of the user may be significantly improved.

20 Claims, 5 Drawing Sheets

(52) U.S. Cl.
CPC ............. *H04L 63/18* (2013.01); *H04W 12/06* (2013.01); *H04W 12/69* (2021.01)

(58) Field of Classification Search
CPC .... H04L 63/0876; H04L 63/20; H04W 12/69; H04W 12/06; H04W 12/77
See application file for complete search history.

(56) References Cited

U.S. PATENT DOCUMENTS

| | | | | |
|---|---|---|---|---|
| 2011/0265155 | A1* | 10/2011 | Liu | H04L 63/0884 726/5 |
| 2012/0209686 | A1* | 8/2012 | Horowitz | G06K 7/1417 705/14.26 |
| 2012/0240214 | A1* | 9/2012 | Ogura | G06F 21/31 726/12 |
| 2013/0227099 | A1 | 8/2013 | Hinton et al. | |
| 2015/0326578 | A1* | 11/2015 | Hsu | H04L 63/10 726/9 |
| 2015/0381739 | A1* | 12/2015 | Chai | H04L 67/141 726/7 |
| 2016/0285858 | A1* | 9/2016 | Li | H04L 63/0815 |
| 2018/0083977 | A1* | 3/2018 | Murugesan | G06F 16/27 |
| 2020/0257625 | A1* | 8/2020 | Parakh | G06F 12/0897 |

FOREIGN PATENT DOCUMENTS

| | | |
|---|---|---|
| EP | 2487875 A2 | 8/2012 |
| EP | 2817733 A1 | 12/2014 |
| WO | 2010/040378 A1 | 4/2010 |
| WO | 2012/040198 A1 | 3/2012 |

OTHER PUBLICATIONS

Kaji et al., "IdP Proxy for Combined Authentication Based on Multiple IdPs", IEEE 4th International Symposium on Advanced Networks and Telecommunication Systems, Dec. 16-18, 2010, pp. 34-36.

Office action received for corresponding Chinese Patent Application No. 201611141823.1, dated Dec. 14, 2020, 3 pages of office action and no page of translation available.

Office action received for corresponding Chinese Patent Application No. 201611141823.1, dated Apr. 26, 2020, 10 pages of office action and 4 pages of translation available.

* cited by examiner

METHODS AND DEVICES FOR AUTHENTICATION

RELATED APPLICATION

This application was originally filed as Patent Cooperation Treaty Application No. PCT/EP2017/080609, filed 28 Nov. 2017 which claims priority benefit to China Patent Application No. 201611141823.1, filed 12 Dec. 2016.

TECHNICAL FIELD

Embodiments of the present disclosure generally relate to the field of telecommunications, and in particular, to methods and devices for an authentication of an identity of a user.

BACKGROUND

An OpenID protocol is an open and decentralized authentication protocol. This protocol allows a user to use an existing account to sign into a plurality of websites, which alleviates inconvenience due to conventional creation of different accounts for different network services. For example, the user may associate login information with an open identity (ID) (or a common ID) of the user. In the context of the present disclosure, the open ID (or common ID) of a user refers to an ID that is open to be shared among a plurality of web services or other services that the user requests to access. Examples of the user's open ID include, but are not limited to, an email address, a name, and the like of the user. Typically, the user may choose a specific service that may use the open ID for the login.

The OpenID technology becomes increasingly popular on the Internet. There are millions of OpenID enabled user accounts, and more than 50 thousand websites allow logins based on the OpenID. The OpenID protocol is open and decentralized as described above, and therefore any person or organization may use the OpenID protocol. Currently, there are many organizations that accept and contribute to the OpenID technology, for example, by enabling authentication based on the user's open ID.

SUMMARY

In general, example embodiments of the present disclosure provide methods and devices for an authentication of an identity of a user.

In a first aspect, a method implemented at a client device is provided. According to the method, the client device reads a digital tag associated with a service to be accessed, the digital tag being encoded with an identifier associated with a service provider that provides the service. The client device then decodes the digital tag to obtain the identifier. Further, the client device determines an authentication proxy associated with the service provider, and sends, to the associated authentication proxy, the identifier and a first request for an authentication of an identity of a user associated with the client device.

In a second aspect, a method implemented at an authentication proxy is provided. According to the method, the authentication proxy receives, from a client device, an identifier associated with a service provider that provides a service to be accessed, and a first request for an authentication of an identity of a user associated with the client device. The authentication proxy determines an identity provider associated with the service provider, and sends, to the associated identity provider, the identifier and a second request for the authentication of the identity of the user.

In a third aspect, a client device is provided. The client device comprises a processor and a memory. The memory includes machine readable instructions that, when executed by the controller, cause the client device to perform the method according to the first aspect.

In a fourth aspect, an authentication proxy is provided. The authentication proxy comprises a processor and a memory. The memory includes instructions that, when executed by the controller, cause the authentication proxy to perform the method according to the second aspect.

Through the following description, it would be appreciated that according to embodiments of the present disclosure, the client device determines the authentication proxy for an authentication of an identity of an associated user and sends to the authentication proxy an identifier associated with a service provider and a request for the authentication. Accordingly, the authentication proxy determines the identity provider for the authentication and sends to the identity provider the identifier associated with the service provider and a request for the authentication such that the identity provider authenticate the identity of the user. With the mediation operations of the authentication proxy among the client device, the service provider, and the identity provider, the authentication of the identity of the user may be more secure.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "client device" refers to an entity capable of, configured for, arranged for, and/or operable for accessing a service provided by a service provider, for example, in response to a request of an associated user. Examples of the client device include, but are not limited to, the following devices: personal computers, desktops, mobile phones, cellular phones, smart phones, personal digital assistants (PDAs), personal computers, portable computers, image capture devices such as digital cameras, gaming devices, wearable devices such as smart watches and smart glasses, music storage and playback appliances, Internet appliances enabling wireless or wired Internet access and browsing, secure devices enabling wireless communication technologies, such as Near Field Communication (NFC) and/or Radio Frequency Identification (RFID) technologies, and the like.

As used herein, the term "service provider" refers to an entity capable of, configured for, arranged for, and/or operable for providing the client device with a service, including, but are not limited to, web services and other online services, and any other suitable services, such as a smart lock service. Examples of the service provider include, but are not limited to, computers, servers, blades, and the like.

As used herein, the term "identity provider" refers to an entity capable of, configured for, arranged for, and/or operable for assisting the service provider in the authentication of an identity of the user. The identity provider can provide an authentication result to the service provider. The service provider may further determine whether to provide the service to the client device based on the authentication result. Examples of the identity provider include, but are not limited to, computers, servers, blades, and the like.

As used herein, the term "authentication proxy" refers to an entity that acts as an intermediary among the client device, the service provider, and the identity provider during the authentication of the identity of the user. With mediation operations of the authentication proxy, the user associated with the client device may be authenticated by the identity provider, and the service provider may respond to an access request of the user based on the authentication result. Examples of the authentication proxy likewise include, but are not limited to, computers, servers, blades, and the like. The authentication proxy may be provided by a credible party, such as an organization trusted by the client device, the service provider, and/or the identity provider.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

As described above, the OpenID protocol, which is an open and decentralized authentication protocol, allows a user to use an existing account to sign into a plurality of websites, rather than to create different accounts for different network services. By way of example, if a user requests a service (for example, webpage browsing) provided by a service provider, the service provider will authenticate an identity of the user. Conventionally, with the OpenID technology, the user provides the service provider with his/her identity associated with an OpenID provider. In the context of the present disclosure, the OpenID provider refers to an entity which maintains an open ID (or common ID) of a user and authentication information thereof and which assists the service provider in the authentication of the identity of the user with the OpenID technology.

After receiving the user's identity, the service provider sends the identity to the OpenID provider for authentication. If the authentication result from the OpenID provider indicates that the user's identity is valid, the service provider may accept this assertion of the OpenID provider and determine the validity of the user. Typically, in order to enable the authentication, the user has to authenticate against the OpenID provider first and validate his/her identity such that this identity can be used for subsequent logins into the service provider or other service providers.

Since the OpenID protocol is open and decentralized, as described above, any person or organization may use the OpenID protocol, and, for example, become the OpenID provider if necessary. However, such a free use of the OpenID technology causes several security problems. One critical security problem is phishing. In an OpenID enabled system, there are generally the following two common phishing attacks:

Phished OpenID Provider Page—A rogue service provider redirects the user to a phished page which is faked to be related to the OpenID provider, and the user is tricked to enter on the phished page the identity, such as a user's credential associated with the OpenID provider, including, but not limited to, a user name and a password.

Realm Spoofing—A malicious service provider crafts an authentication page which includes an OpenID provider realm set as a trusted domain and which also includes a return address pointing back to its own page. After the user enters the user's identity, the client device is redirected back to the malicious service provider instead of the OpenID provider.

Moreover, malicious software such as Trojans may attack and control the client device and therefore steal the user's credential associated with the OpenID provider. Therefore, there is a need for improving security of the OpenID enabled system to prevent various malevolent attacks.

In order to at least in part solve the above and other potential problems, embodiments of the present disclosure provide a secure and efficient authentication of an identity of a user by means of an associated client device and authentication proxy. According to embodiments of the present disclosure, at the client device, a digital tag associated with a service to be accessed is read and then decoded to obtain an identifier associated with a service provider that provides the service. The client device then determines an authentication proxy associated with the service provider and sends to the associated authentication proxy the identifier and a request (referred to as a "first request") for an authentication of an identity of an associated user.

Accordingly, at the associated authentication proxy, after the identifier and the first request are received from the client device, an identity provider associated with the service provider is determined. The authentication proxy sends, to the associated identity provider, the identifier associated with the service provider and a request (referred to as a "second request") for the authentication of the identity of the user. Further, the identity provider may implement the authentication of the identity of the user and provide the authentication result to the service provider.

With the mediation operations of the authentication proxy among the client device, the service provider, and the identity provider, the authentication of the identity of the user may be more secure compared with the conventional authentication procedure as described above. Principles and implementations of the present disclosure will be described in detail below with reference to FIGS. 1-8.

Figure 1:
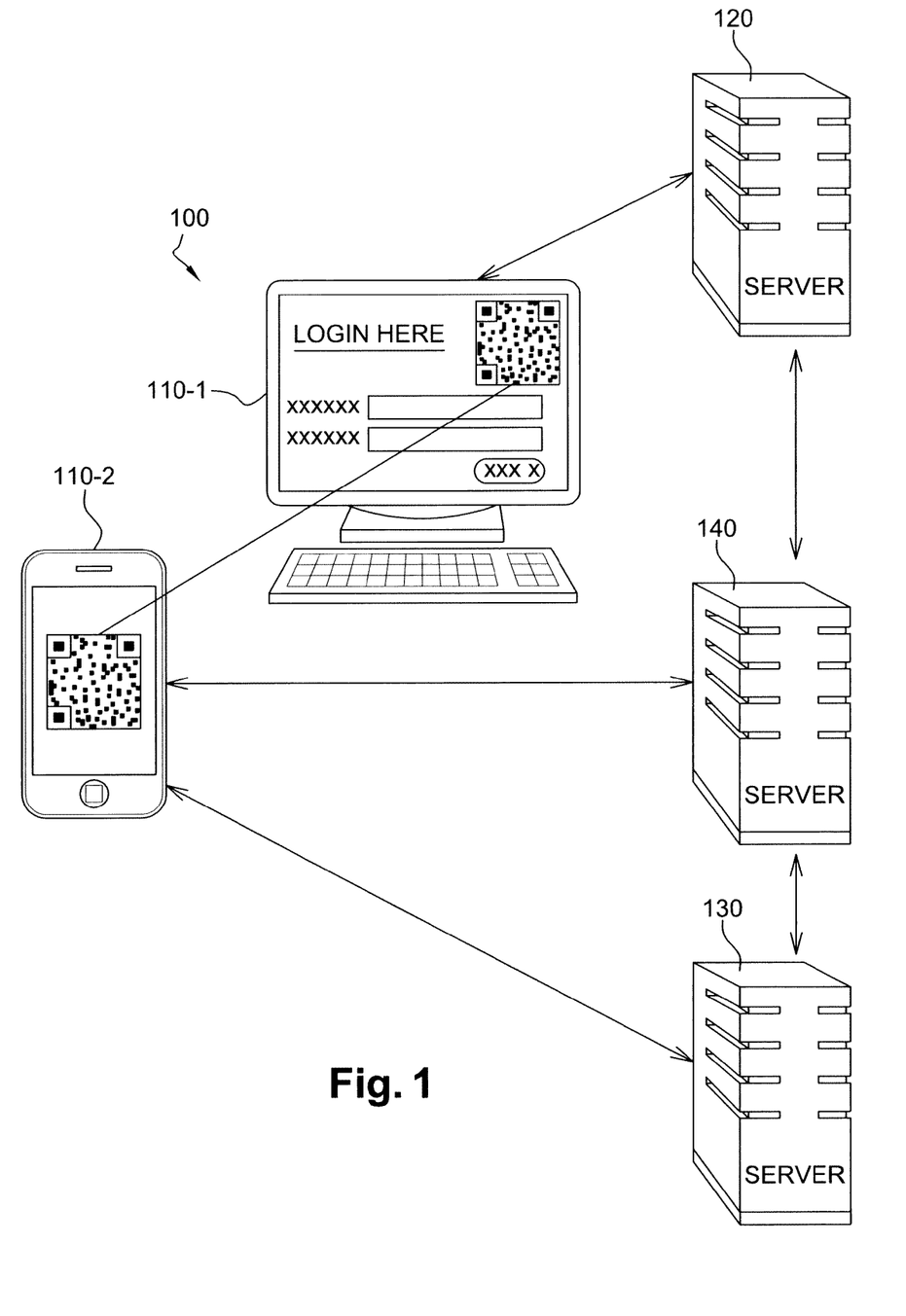
FIG. 1 is a system in which embodiments of the present disclosure can be implemented.

Reference is first made to FIG. 1 which shows an example architecture of a system 100 in which embodiments of the present disclosure can be implemented. The system 100 includes two client devices 110-1 and 110-2 (collectively referred to as "client devices" 110), a service provider 120, an authentication proxy 130, and an identity provider 140. The numbers of client devices, service providers, authentication proxies, and identity providers as shown are only illustrative but not limited. The system 100 may include any suitable number of client devices, service providers, authentication proxies, and identity providers.

The client devices 110, the service provider 120, the authentication proxy 120, and the identity provider 140 may communicate with each other. The communications in the system 100 may conform to any suitable wired or wireless communication technologies and corresponding communication standards. Examples of the communication technologies include, but are not limited to, asymmetric digital subscriber line (ADSL), Long Term Evolution (LTE), LTE-Advanced (LTE-A), Wideband Code Division Multiple Access (WCDMA), Code Division Multiple Access (CDMA), Global System for Mobile Communications (GSM), Wireless Local Area Network (WLAN), Worldwide Interoperability for Microwave Access (WiMAX), Bluetooth, ZigBee technologies, and the like. Furthermore, the communications may be performed according to any suitable communication protocols, including, but not limited to, Transmission Control Protocol (TCP)/Internet Protocol (IP), Hyper Text Transfer Protocol (HTTP), User Datagram Protocol (UDP), Session Description Protocol (SDP) protocols, and the like.

In this example, a user uses the client device 110-1 (for example, a computer) to request a web service (for example, web browsing) provided by the service provider 120. It is to be understood that the web service is only illustrative but not limited. Other types of services are possible. For example, the service to be accessed may include a smart lock service, a car, and the like. Detailed examples will be described in the following paragraphs.

In response to the request of accessing the web service, as shown, the service provider 120 presents a digital tag on a login webpage, for example, in a form of a two-dimensional code, such as a quick response (QR) code. The digital tag is encoded with an identifier associated with the service provider 120. It is to be understood that the two-dimensional code for implementing the digital tag is only illustrative but not limited. The digital tag may be implemented in any suitable form. For example, the digital tag may also be implemented as a NFC tag, a RFID tag, or the like.

According to embodiments of the present disclosure, the identifier associated with the service provider 120 may include any suitable identifier related to the service provider. For example, the identifier may include an identifier of the service provider, such as, a uniform resource locator (URL) of the service provider. The identifier may also include an identifier of a login interface which is provided by the service provider 120 and displayed, for example, on a display of the client device 110-1. The identifier of the login interface may also be implemented in a related URL. With the identifier of the login interface, the service provider 120 may switch to present the webpage requested by the user after the authentication, which will be detailed in the following paragraphs. The digital tag may additionally be encoded with other information, and the embodiments thereof will be described in the following paragraphs.

After the digital tag is presented on the client device 110-1, in this example, the user uses the client device 110-2 (for example, a smart phone) reads the digital tag by scanning the two-dimensional code, for example, using an image capturing module, such as a camera on the smart phone. By decoding the two-dimensional code, the client device 110-2 may obtain the identifier associated with the service provider 120. Technologies of decoding a two-dimensional code is known in the art, and the details thereof will be omitted herein.

It is to be understood that different client devices 110-1 and 110-2 respectively used for accessing the service and used for the authentication of the identity of the user is only for the purpose of illustration, without suggesting any limitation. In some embodiments, the user may use the same client device 110 to access the service and implement the authentication, which will be detailed in the following paragraphs.

After obtaining the identifier associated with the service provider 120, the client device 110-2 determines an authentication proxy associated with the service provider 120. In this example, the authentication proxy 130 is determined to be associated with the service provider 120. As shown, the client device 110-2 sends to the authentication proxy 130 the identifier associated with the service provider 120 and the first request for the authentication of the identity of the user.

After the authentication proxy 120 receives the identifier and the first request from the client device 110-2, the authentication proxy 130 determines an identity provider associated with the service provider 120. In this example, the identity provider 140 is determined to be associated. The authentication proxy 130 then sends, to the identity provider 140, the identifier associated with the service provider 120 and the second request for the authentication of the identity of the user.

Compared to conventional direct exchanges between the client device 110, the service provider 120, and the identity provider 140 during the authentication of the user identity, the authentication procedure with the mediation operations of the authentication proxy 130 is more secure and reliable to prevent malicious attacks, for example, on the Internet. Detailed example implementations of the elements in the system 100 will be described with reference to FIGS. 2 and 3.

Figure 2:
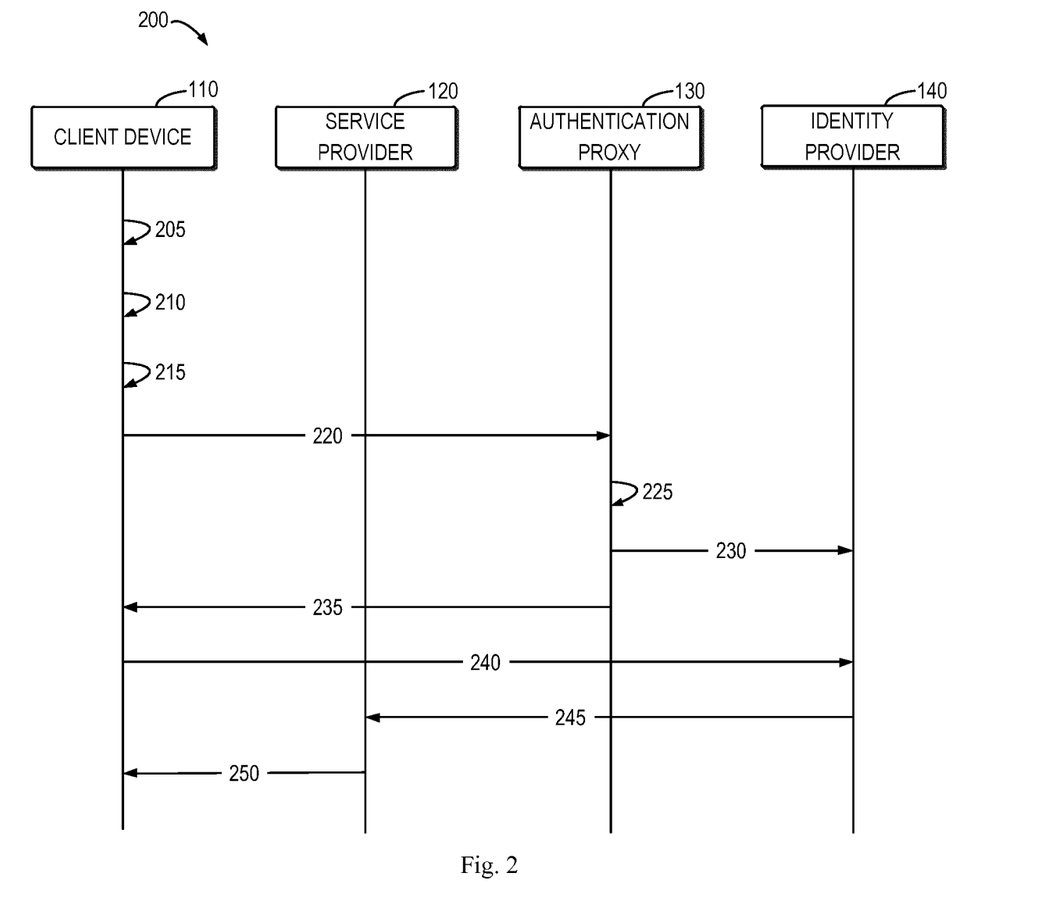
FIG. 2 is an example communication and processing procedure among various elements in a system according to some embodiments of the present disclosure.

FIG. 2 illustrates an example communication and processing procedure 200 among various elements, such as the client device 110, the service provider 120, the authentication proxy 130, and the identity provider 140, in the system 100 according to some embodiments of the present disclosure. It is to be understood that a few acts/steps in the procedure 200 may not be necessary. In some other embodiments, these acts/steps may be omitted, as will be described below in detail.

As shown, the client device 110 reads (205) a digital tag associated with a service to be accessed, and the digital tag is encoded with an identifier associated with the service provider 120. As described above, the identifier associated with the service provider 120 may be any suitable identifier that is related to the service provider 120, including, for example, the identifier of the service provider 120 and the identifier of the login page provided by the service provider 120. Furthermore, the digital tag may be implemented as any suitable tag in any suitable form, including, for example, a time-dimensional code, such as the QR code, the NFC tag, the RFID tag, or the like.

As described above, in addition to the identifier associated with the service provider 120, the digital tag may be encoded with further information for the authentication. In some embodiments, the digital tag may be further encoded with identification information (referred to as "first identification information") of one or more candidate authentication proxies associated with the service provider. The first identification information may be any suitable information that can identify the candidate authentication proxy. For example, the first identification information may be a name of the candidate authentication proxy, for example, represented by a character string.

In some other embodiments, the digital tag may be encoded with identification information (referred to as "second identification information") of one or more candidate identity providers associated with the service provider 120. Similar to the first identification information, the second identification information may be any suitable information that can identify the candidate identity providers, such as a name of the candidate identity provider, for example, represented by a character string. The first and second identification information may be used by the client device 110 for subsequent operations, and the embodiments thereof will be described in the following paragraphs.

As described above, the client devices for accessing the service and for reading the digital tag may or may not be the same. For example, as described above with reference to FIG. 1, the client device 110-1 (for example, a personal computer) may be used to access the service (for example, the webpage browsing), and the client device 110-2 (for example, a smart phone) may be used to read the digital tag which is provided by the service provider 120 and displayed on the client device 110-1. In this example, the client device 110-2 for the authentication may be any suitable device, including, but not limited to, a mobile phone, a pad, or a dedicated secure machine. The dedicated secure machine may be implemented as any suitable devices, including, for example, a smart key.

In the case that the authentication is performed by means of the dedicated secure machine, such as a smart key, acting as the client device 110-2, in some embodiments, the client device 110-2 may have dedicated hardware with a read-only storage to guarantee the security of its local data. In this way, the attacks from the malicious software like Trojans that may control the client device 110-1 and steal the authentication information may be prevented. Accordingly, the security of the identity of the user, such as the user's credential, may be guaranteed during the authentication.

It is also possible that the client device 110-2 as shown in FIG. 1 may be used both for accessing the service and for reading the digital tag. For example, after the digital tag, such as the QR code, is presented on the login page that is, for example, displayed on a touch screen of the client device 110-2, the client device 110-2 may read the digital tag, for example, using a built-in scanning function. Technologies of such reading are also known in the art, and the details thereof will be omitted.

After reading (205) the digital tag, the client device 110 decodes (210) the digital tag to obtain the identifier associated with the service provider 120. According to embodiments of the present disclosure, any decoding technology, known in the art or developed in the future, may be employed.

Then, the client device 110 determines (215) an authentication proxy associated with the service provider 120. The determination of the authentication proxy may be implemented in any suitable way. In the embodiments where the digital tag is additionally encoded with the first identification information of one or more candidate authentication proxies associated with the service provider, when the client device 110 decodes (210) the digital tag, the client device 110 may obtain the identifier associated with the service provider 120 as well as the first identification information. From the one or more candidate authentication proxies, the client device 110 may select the associated authentication proxy.

The selection of the associated authentication proxy may be based on any suitable rule. In some embodiments, one or more authentication proxies may be predefined to be associated with the service provider 120 and locally maintained in the client device 110. The client device 110 may select the associated authentication proxy from the candidate authentication proxies based on the predefined authentication proxies.

The predefinition of the authentication proxy may be based on any suitable criterion. For example, the user may predefine an authentication proxy that is trusted for use in an authentication of the identity of the user.

The client device 110 may determine the associated authentication proxy based on the predefined authentication proxy in any suitable way. By way example, the client device 110 may first determine whether there is the predefined authentication proxy to be associated with the service provider 120. If the predefined authentication proxy is determined, the client device 110 may determine whether the predefined authentication proxy is included in the one or more candidate authentication proxies. If yes, the client device 110 may select the predefined authentication proxy as the associated authentication proxy.

If the digital tag read by the client device 110 does not involve the first identification information of the one or more candidate authentication proxy, while a default authentication proxy has been predefined locally in the client device 110, in some embodiments, the client device 110 may determine the default authentication proxy as the associated authentication proxy.

In addition to the selection of the associated authentication proxy based on the predefined authentication proxy, in some embodiments, the client device 110 may select the associated authentication proxy from the one or more candidate authentication proxies based on local records. For example, the client device 110 may locally store addresses of authentication proxies in association with identification information of authentication proxies. The associations between the addresses and identification information of authentication proxies may be stored in a local storage (referred to as a "first local storage"), for example, in a form of a table. An example of such a table will be described in the following paragraphs. It is to be understood that other storage forms of the associations may be possible.

In this example, the client device 110 may search the first local storage for an association (referred to as a "first association") between the first address of one of the one or more candidate authentication proxies and the first identification information of the candidate authentication proxy. If the first association is found, the client device 110 may select the candidate authentication proxy as the authentication proxy associated with the service provider 120.

According to embodiments of the present disclosure, the service provider 120 only provides the first identification information of one or more candidate authentication proxies, such as names of the candidate authentication proxies. The retrieving of the addresses of the candidate authentication proxies may be implemented by the client device 110. Thus, there is no need for the service provider 120 to redirect the client device 110 to an identity provider for the authentication. In this way, the possibility that a rogue service provider redirects the client device 110 to a phished page may be reduced. Accordingly, the possibility that the user's identity is stolen by a malicious service provider may be reduced.

As shown in FIG. 2, in the procedure 200, the authentication proxy 130 is determined (215) to be associated with the service provider 120. The client device 110 sends (220), to the authentication proxy 130, the identifier associated with the service provider 120 and the first request for the authentication of the identity of the user. The client device 110 may exchange with other elements in the system 100 in any suitable way. For example, dedicated client applications for the exchange may be installed into the client device 110. As an alternative example, the client device 110 may exchange with other elements via a communication interface. In this case, the exchange result may be presented, for example, via applications, such as on a webpage presented by browser applications.

The identifier and the first request may be sent by the client device 110 to the authentication proxy 130 in any suitable form. For example, the client device 110 may send a message "Authentication Request" to the authentication proxy 130 which carries the identifier. Furthermore, the sending may be implemented by the client device 110 in any suitable way. In the embodiments where the authentication proxy 130 is determined by searching the first local storage, the client device 110 may thereby retrieve the address of the authentication proxy 130 based on the local records in the first local storage and then send the identifier and the first request to the authentication proxy 130 based on the retrieved address.

In addition, as described above, in some embodiments, the digital tag may be also encoded with the second identification information of the one or more candidate identity providers associated with the service provider 120. In this case, when the client device decodes (210) the digital tag, the client device 110 may also obtain the second identification information. In these embodiments, the client device 110 may send (220), to the authentication proxy 130, the identifier associated with the service provider 120 and the first request for the authentication of the identity of the user, along with the second identification information of the one or more candidate identity providers.

In some embodiments, the client device 110 may additionally determine a predefined identity provider is to be associated with the service provider 120 and send an indication of the predefined identity provider to the authentication proxy 130 in the sending (220). Similar to the predefinition of the authentication proxy, the predefinition of the identity provide may also be based on any suitable criterion, including, but not limited to, the trust of the identity provider by the user for the authentication, for example.

According to embodiments of the present disclosure, the indication of the predefined identity provider may be implemented in any suitable form. In some embodiments, the client device 110 may maintain addresses of the predefined identity providers in the first local storage, for example, in a form of the table. An example of the table is shown as below:

TABLE 1

| Name | Address | Type |
| --- | --- | --- |
| ABC | ABC's address | Identity Provider |
| DEF | DEF's identity provider address | Identity Provider |
| DEF | DEF's authentication proxy address | Authentication Proxy |

In Table 1, as shown, the addresses of the identity providers are stored in association with the corresponding identification information of the identity providers which are represented in the names thereof. In addition to information related to the identity providers, Table 1 also includes the name and address of the authentication proxy. Specifically, in Table 1, the identity information "DEF" is associated with two addresses including an address of "DEF's identity provider address" and an address of "DEF's authentication proxy address."

If the address of the predefined identity provider is locally stored in the client device 110, the client device 110 may send the address (referred to as "second address") of the predefined identity provider as the indication of the predefined identity provider to the authentication proxy 130. Other forms of the indication are also possible, and the scope of the present disclosure will not be limited in this regard.

As shown in FIG. 2, after the authentication proxy 130 receives, from the client device 110, the identifier associated with the service provider 120 and the first request for the authentication of the identity of the user, the authentication proxy 130 determines an identity provider associated with the service provider 120. The determination of the associated identity provider may be implemented in any suitable way. In the embodiments where the authentication proxy 130 receives the second identification information of the one or more candidate identity providers from the client device 110, the authentication proxy 130 may select the associated identity provider from the one or more candidate identity providers.

The selection may be based on any suitable rule. In the embodiments where the authentication proxy 130 receives from the client device 110 the indication of the predefined identity provider that is to be associated with the service provider 120, the authentication proxy 130 may select the associated identity provider from the one or more candidate identity providers based on the indication of the predefined identity provider.

By way of example, the authentication proxy 130 may locally store associations between addresses and identification information of identity providers in a local storage (referred to as a "second local storage"), for example, in a form of a table. The table in authentication proxy 130 is similar to Table 1 in the client device 110 as described above. It is to be understood that the associations may be stored in other forms, and the scope of the present disclosure will not be limited in this regard.

If the authentication proxy 130 receives the second address of the predefined identity provider as the indication of the predefined identity provider from the client device 110, the authentication proxy 130 may search the second local stage for an association (referred to as a "second association") between the second address of the predefined identity provider and the second identification information of the one or more candidate identity providers. If the second association is found, the authentication proxy 130 may select the predefined identity provider as the identity provider to be associated with the service provider 120. If there is no such an association, in some embodiments, the authentication proxy 130 may return an error message to the client device 110. Accordingly, the client device 110 has no access to the service provider 110.

Since the identity provider that is predefined by the user based on the trust of the identity provider as described above, the selection of the associated identity provider based on the predefined identity provider may reduce a possibility that a phished identity provider is selected for the subsequent authentication. Thereby, the security of the authentication for the user may be improved.

If the authentication proxy 130 receives from the client device 110 only the second identification information of the candidate identity providers without an indication of the predefined identity provider, in some embodiments, the authentication proxy 130 may search the second local storage for an association (referred to as a "third association") between a third address of one of the one or more candidate identity providers and the second identification information of the candidate identity provider. If the third association is found, the authentication proxy 130 may select the candidate identity provider as the associated identity provider.

According to embodiments of the present disclosure, the service provider 120 only provides the identification information of the related identity provider, and the authentication proxy 130 retrieves the address of the identity provider from the identification information based on the local records. Thus, the possibility that a rogue service provider redirects the client device to a phished page may be reduced.

As shown in FIG. 2, the identity provider 140 is determined to be associated with the service provider 120. Then, the authentication proxy 130 sends (230) to the identity provider 140 the identifier associated with the service provider 120 and the second request for the authentication of the identity of the user. The identifier and the second request may be sent in any suitable form. Likewise, a message "Authentication Request" including the identifier may be sent by the authentication proxy 130 to the identity provider 140.

The sending of the identifier and the second request may be implemented in any suitable way. In the embodiments where the identity provider 140 is determined by searching the second local storage, the authentication proxy 130 may thereby retrieve the address of the identity provider 140 based on the local records in the second local storage and then send the identifier and the second request to the identity provider 140 based on the retrieved address.

After the authentication proxy 130 triggers the second request for the authentication of the identity of the user, the identity provider 140 may authenticate the identity of the user. The authentication may be implemented by the identity provider 140 in any suitable way. In some embodiments, as shown in FIG. 2, the authentication proxy 130 may send (235) the address of the identity provider 140 to the client device 110 to redirect the client device 110 to the identity provider 140 for the subsequent authentication. The address for the redirection may be sent in any suitable way. For example, the authentication proxy 130 may send a HTTP response with a redirection header pointing to the address of the identity provider 140.

Then, the client device 110 may authenticate (240) against the identity provider 140. If the client device 110 receives the address of the identity provider 140 from the authentication proxy 130, the client device 110 may send the identity of the user to the identity provider based on the received address. The sending of the identity of the user may be implemented in any suitable way. For example, a login form from the identity provider 140 may be presented by the client device 110 to the user. The user fills out the login form with the user's identity and then submits the login form. Thereby, the identity provider 140 may verify the user's credentials.

Depending on different implementations, approaches of the login may be different. In addition to entering the user's identity into the login form, the authentication of the identity of the user may also be implemented through facial recognitions, fingerprints, voices, and the like. In this way, if the identity provider 140 enables the authentication based on the fingerprints, the service provider 120 may also enable such an authentication for the login. Accordingly, the authentication for the user may be more flexible.

If the identity of the user is valid, the identity provider 140 may send (245) the authentication result to the service provider 120. The authentication result may be sent in any suitable form. In some embodiments, the identity provider 140 may send to the service provider 120 a message to indicate that the authentication is done. For example, the identity provider 140 may determine the service provider 120 based on the identifier received from the authentication proxy 130 and, then, send, to the service provider 120, a message "Authentication Done" including the authentication result.

Based on the authentication result from the identity provider 140, the service provider 120 proceeds (250) with the login of the user. If the authentication is passed, in the embodiments where the identifier associated with the service provider 120 includes the identifier of the login page, the service provider 120 may switch to present the content that is requested by the user. In implementations, the service provider 120 may retrieve the content based on the identifier of the login interface. According to embodiments of the present disclosure, the user may log into the service provider 120 without inputting anything on the login page. In this way, the authentication of the identity of the user is more secure.

As described above, conventionally, a rogue service provider may redirect a client device to a phished OpenID provider page where the user will be tricked to enter his/her credentials. For example, the rogue service provider may claim that it supports a certain OpenID provider. However, if the user chooses an authentication through the OpenID provider, the rogue service provider may redirect the client device to a fake OpenID provider's page to steal the user's identity. According to embodiments of the present disclosure, the above redirection is performed by the authentication proxy instead of the service provider. The service provider only indicates the identification information, such as the name of the supported identity provider. For example, a list of the supported identity providers may be provided by the service provider. Accordingly, the service provider may not trigger the redirection. In this way, the security of the authentication may be improved.

Figure 3:
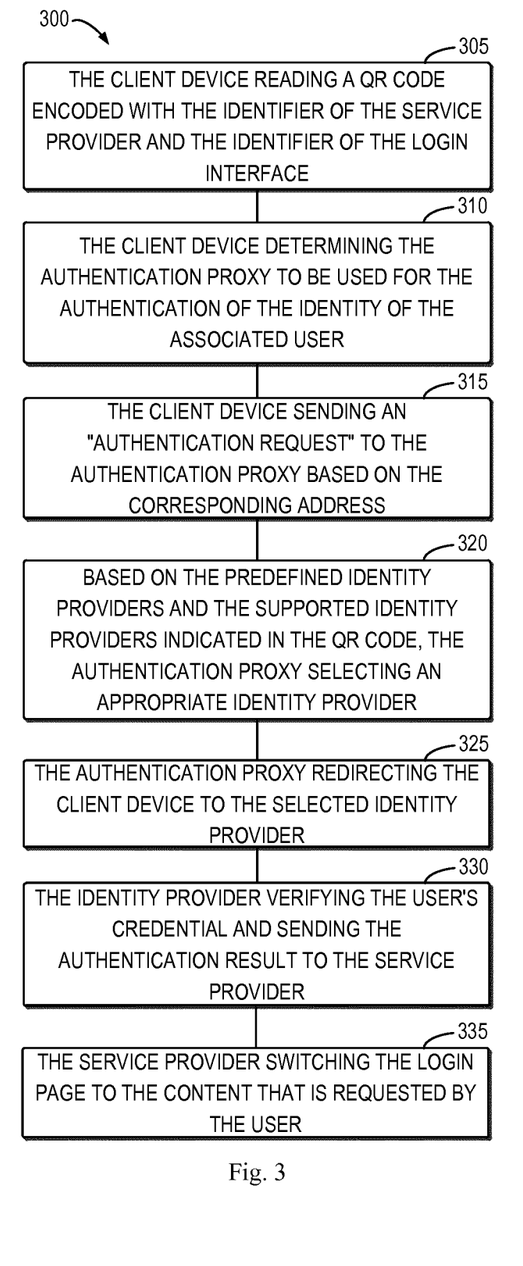
FIG. 3 is an example communication and processing procedure among various elements in a system according to some other embodiments of the present disclosure.

A detailed example procedure will be described below with reference to FIG. 3 and Table 1. As shown, at block 305, the client device 110 reads a QR code encoded with the identifier (for example, the URL) of the service provider 120 and the identifier of the login interface. In this example, the QR code is also encoded with the first identification information of the authentication proxy and the second identification information of the identity provider supported by the service provider 120. By way of example, the service provider 120 may support two identity providers {ABC, GHI}, and two authentication proxies {DEF, JKL}. Accordingly, a list of the supported identity providers and authentication proxies may be encoded in the QR code.

At block 310, based on the local records, the client device 110 determines which authentication proxy will be used for the subsequent authentication of the identity of the associated user. In this example, the authentication proxy DEF as shown in Table 1 is a default authentication proxy. Accordingly, the client device 110 selects the authentication proxy DEF as the associated authentication proxy and then retrieves the address of the authentication proxy DEF from Table 1.

At block 315, the client device 110 sends an "Authentication Request" to the selected authentication proxy (for example, the authentication proxy DEF) based on the corresponding address retrieved from Table 1. At block 320, based on the list of the identity providers predefined in the client device 110, for example, {ABC} in Table 1, and the list of the supported identity providers {ABC, GHI} indicated in the QR code, the authentication proxy 130 selects an appropriate identity provider (for example, the identity provider ABC). Then, the authentication proxy 130 retrieves the address of the selected identity provider from the local records, for example, in a table similar to Table 1.

At block 325, the authentication proxy 130 redirects the client device 110 to the selected identity provider 140. Since the redirected address is provided by the authentication proxy 130 instead of the service provider 120, it is impossible for a rogue service provider to trigger a redirection to a phished identity page.

At block 330, the identity provider verifies the user's credential and sends the authentication result to the service provider 120. In this example, the authentication result indicates that the authentication is passed. At block 335, the service provider 120 switches the login page to the content that is requested by the user. For example, the service provider 120 may show the content to the address indicated by the identifier of the login interface included in the identifier received from the identity provider 140.

As described above, the approaches of the authentication may be different depending on different implementations. By way of example, if the identity provider 140 supports the Login based on the fingerprints, after the user uses the client device 110-2 (for example, a smart phone) to scan the QR code provided on the login page as shown in FIG. 1, the user may push his/her fingerprint on the client device 110-2. After the authentication is done, the requested webpage may be shown by the service provider 120 on the client device 110-1.

As described above, the service may be any other suitable service instead of the web service. By way of example, the service may include the smart lock service. In the scenario that the smart lock service is to be accessed, the service provider may be implemented as a smart lock which transmits its identifier through any suitable wireless technology, such as the NFC technology, the RFID technology, and the like. The client device may be implemented as a smart key device (for example, a mobile device installing a dedicated client application). The client device may approach the service provider and read the identifier of the service provider. Further, the user may enter the identity, for example, by pushing his/her fingerprint on the client device. The lock may be open if the authentication of the identity of the user is passed.

Figure 4:
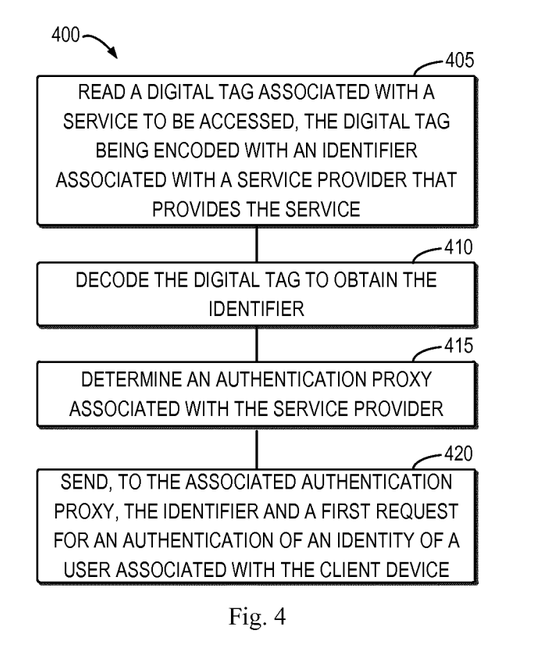
FIG. 4 is a flowchart of a method at a client device according to some embodiments of the present disclosure.

FIG. 4 shows a flowchart of an example method 400 at the client device according to some embodiments of the present disclosure. The method 400 can be implemented at the client device 110 as shown in FIGS. 1 and 2.

As shown, at block 405, a digital tag associated with a service to be accessed is read. The digital tag is encoded with an identifier associated with a service provider that provides the service. At block 410, the digital tag is decoded to obtain the identifier. At block 415, an authentication proxy associated with the service provider is determined. At block 420, the identifier and a first request for an authentication of an identity of a user associated with the client device is sent to the associated authentication proxy.

In some embodiments, the digital tag may be further encoded with first identification information of one or more candidate authentication proxies associated with the service provider. In these embodiments, the digital tag may be decoded to obtain the first identification information. Then, the associated authentication proxy may be selected from the one or more candidate authentication proxies.

In some embodiments, a predefined authentication proxy may be determined to be associated with the service provider. In these embodiments, it may be determined whether the predefined authentication proxy is included in the one or more candidate authentication proxies. In response to the inclusion of the predefined authentication proxy, the predefined authentication proxy may be selected as the associated authentication proxy.

In some embodiments, a first local storage may be searched for a first association between a first address of one of the one or more candidate authentication proxies and the first identification information of the candidate authentication proxy. In response to finding the first association, the candidate authentication proxy may be selected as the associated authentication proxy. In some embodiments, the identifier and the first request to the associated authentication proxy may be sent based on the first address.

In some embodiments, the digital tag may be further encoded with second identification information of one or more candidate identity providers associated with the service provider. In these embodiments, the digital tag may be decoded to obtain the first identification information. The first identification information may then be sent to the associated authentication proxy.

In some embodiments, a predefined identity provider may be determined to be associated with the service provider. An indication of the predefined identity provider may be sent to the associated authentication proxy. In some embodiments, a second address of the predefined identity provider may be sent to the associated authentication proxy.

In some embodiments, a third address of an identity provider associated with the service provider may be received from the associated authentication proxy. In these embodiments, the identity of the user for the authentication may be sent to the identity provider based on the third address.

Figure 5:
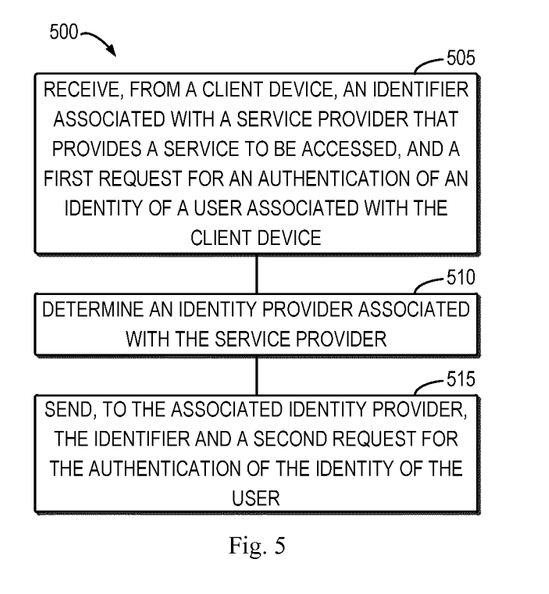
FIG. 5 is a flowchart of a method at an authentication proxy according to some embodiments of the present disclosure.

FIG. 5 shows a flowchart of an example method 500 at the authentication proxy according to some embodiments of the present disclosure. The method 500 can be implemented at the authentication proxy 130 as shown in FIGS. 1 and 2.

As shown, at block 505, an identifier associated with a service provider, which provides a service to be accessed, and a first request for an authentication of an identity of a user associated with a client device is received from the client device. At block 510, an identity provider associated with the service provider is determined. At block 515, the identifier and a second request for the authentication of the identity of the user are sent to the associated identity provider.

In some embodiments, second identification information of one or more candidate identity providers associated with the service provider may be received from the client device.

The associated identity provider may be selected from the one or more candidate identity providers.

In some embodiments, an indication of a predefined identity provider to be associated with the service provider may be received from the client device. The associated identity provider may be selected from the one or more candidate identity providers based on the indication of the predefined identity provider.

In some embodiments, a second address of the predefined identity provider may be received from the client device. In these embodiments, a second local storage may be searched for a second association between the second address of the predefined identity provider and the second identification information of the one or more candidate identity providers. In response to finding the second association, the predefined identity provider may be selected as the associated identity provider.

In some embodiments, a second local storage may be searched for a third association between a third address of one of the one or more candidate identity providers and the second identification information of the candidate identity provider. In response to finding the third association, the candidate identity provider may be selected as the associated identity provider.

In some embodiments, the identifier and the second request may be sent to the associated identity provider based on the third address. In some embodiments, the third address may be sent to the client device to redirect the client device to the associated identity provider.

It is to be understood that all operations and features related to the client device 110 and the authentication proxy 130 described above with reference to FIGS. 1-3 are likewise applicable to the methods 400 and 500 and have similar effects. For the purpose of simplification, the details will be omitted.

Figure 6:
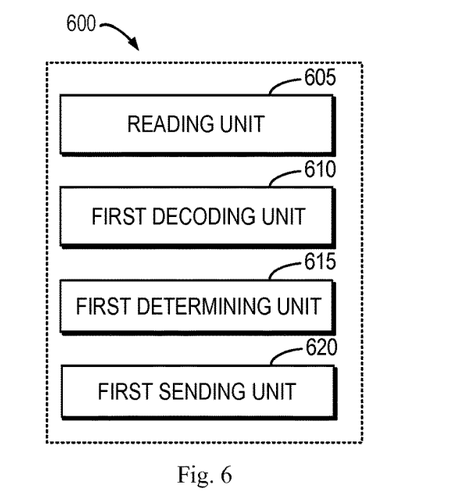
FIG. 6 is a block diagram of an apparatus in accordance with some embodiments of the present disclosure.

FIG. 6 shows a block diagram of an apparatus 600 in accordance with some embodiments of the present disclosure. The apparatus 600 may be implemented at the client device 110 as shown in FIGS. 1 and 2.

As shown, the apparatus 600 (for example, the client device 110) comprises: a reading unit 605 configured to read a digital tag associated with a service to be accessed, the digital tag being encoded with an identifier associated with a service provider that provides the service; a first decoding unit 610 configured to decode the digital tag to obtain the identifier; a first determining unit 615 configured to determine an authentication proxy associated with the service provider; and a first sending unit 620 configured to send, to the associated authentication proxy, the identifier and a first request for an authentication of an identity of a user associated with the client device.

In some embodiments, the digital tag may be further encoded with first identification information of one or more candidate authentication proxies associated with the service provider. The first determining unit 615 may comprise: a second decoding unit configured to decode the digital tag to obtain the first identification information; and a first selecting unit configured to select the associated authentication proxy from the one or more candidate authentication proxies.

In some embodiments, the apparatus 600 may further comprise: a second determining unit configured to determine a predefined authentication proxy to be associated with the service provider. The first selecting unit may comprise: a third determining unit configured to determine whether the predefined authentication proxy is included in the one or more candidate authentication proxies; and a second selecting unit configured to, in response to the inclusion of the predefined authentication proxy, select the predefined authentication proxy as the associated authentication proxy.

In some embodiments, the first selecting unit may comprise: a searching unit configured to search a first local storage for a first association between a first address of one of the one or more candidate authentication proxies and the first identification information of the candidate authentication proxy; and a third selecting unit configured to, in response to finding the first association, select the candidate authentication proxy as the associated authentication proxy.

In some embodiments, the first sending unit may comprise: a second sending unit configured to send the identifier and the first request to the associated authentication proxy based on the first address.

In some embodiments, the digital tag may be further encoded with second identification information of one or more candidate identity providers associated with the service provider. The apparatus 600 may further comprise: a third decoding unit configured to decode the digital tag to obtain the second identification information; and a third sending unit configured to send the second identification information to the associated authentication proxy.

In some embodiments, the apparatus 600 may further comprise: a fourth determining unit configured to determine a predefined identity provider to be associated with the service provider; and a fourth sending unit configured to send an indication of the predefined identity provider to the associated authentication proxy.

In some embodiments, the fourth sending unit may comprise: a fifth sending unit configured to send a second address of the predefined identity provider to the associated authentication proxy.

In some embodiments, the apparatus 600 may further comprise: a receiving unit configured to receive, from the associated authentication proxy, a third address of an identity provider associated with the service provider; and a sixth sending unit configured to send, based on the third address and to the identity provider, the identity of the user for the authentication.

Figure 7:
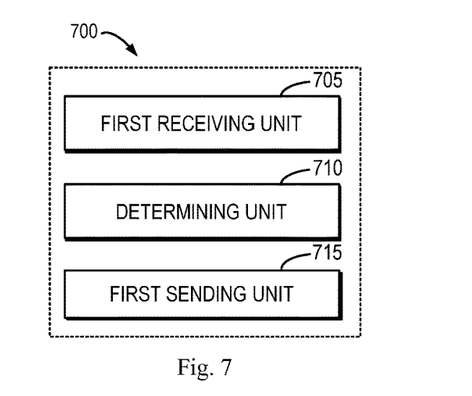
FIG. 7 is a block diagram of an apparatus in accordance with some other embodiments of the present disclosure.

FIG. 7 shows a block diagram of an apparatus 700 in accordance with some embodiments of the present disclosure. The apparatus 700 may be implemented at the authentication proxy 130 as shown in FIGS. 1 and 2.

As shown, the apparatus 700 (for example, the authentication proxy 130) comprises: a first receiving unit 705 configured to receive, from a client device, an identifier associated with a service provider that provides a service to be accessed, and a first request for an authentication of an identity of a user associated with the client device; a determining unit 710 configured to determine an identity provider associated with the service provider; and a first sending unit 715 configured to send, to the associated identity provider, the identifier and a second request for the authentication of the identity of the user.

In some embodiments, the determining unit 710 may comprise: a second receiving unit configured to receive, from the client device, second identification information of one or more candidate identity providers associated with the service provider; and a first selecting unit configured to select the associated identity provider from the one or more candidate identity providers.

In some embodiments, the first selecting unit may comprise: a third receiving unit configured to receive, from the client device, an indication of a predefined identity provider to be associated with the service provider; and a second selecting unit configured to select the associated identity provider from the one or more candidate identity providers based on the indication of the predefined identity provider.

In some embodiments, the third receiving unit may comprise: a fourth receiving unit configured to receive a second address of the predefined identity provider from the client device. The second selecting unit may comprise: a searching unit configured to search a second local storage for a second association between the second address of the predefined identity provider and the second identification information of the one or more candidate identity providers, and a third selecting unit configured to, in response to finding the second association, select the predefined identity provider as the associated identity provider.

In some embodiments, the first selecting unit may comprise: a second searching unit configured to search a second local storage for a third association between a third address of one of the one or more candidate identity providers and the second identification information of the candidate identity provider; and a fourth selecting unit configured to, in response to finding the third association, select the candidate identity provider as the associated identity provider.

In some embodiments, the first sending unit may comprise: a second sending unit configured to send the identifier and the second request to the associated identity provider based on the third address.

In some embodiments, the apparatus 700 may further comprise: a third sending unit configured to send, to the client device, the third address to redirect the client device to the associated identity provider.

It should be appreciated that units included in the apparatuses 600 and 700 correspond to the blocks of the methods 400 and 500. Therefore, all operations and features described above with reference to FIGS. 1 to 5 are likewise applicable to the units included in the apparatuses 600 and 700 and have similar effects. For the purpose of simplification, the details will be omitted.

The units included in the apparatuses 600 and 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the client device 800 and the network entity 900 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 8:
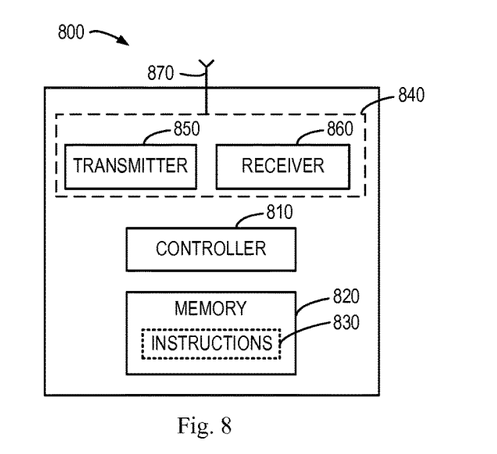
FIG. 8 is a simplified block diagram of a device that is suitable for implementing embodiments of the present disclosure.

FIG. 8 is a simplified block diagram of a device 800 that is suitable for implementing embodiments of the present disclosure. The device 800 can be used to implement the client device 110 and the authentication proxy 130 as shown in FIGS. 1 and 2.

As shown, the device 800 includes a controller 810. The controller controls the operations and functions of the device 800. In some embodiments, the controller 810 may perform various operations by means of instructions 830 stored in a memory 820 coupled to the controller 810. The memory 810 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 810 is shown in the device 800, there may be several physically distinct memory modules in the device 800.

The controller 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple controllers. The controller 810 is coupled with a communication module 840. The communication module 840 includes a transmitter 850 and a receiver 860 which may implement transmission and reception of information by means of one or more antennas 870.

When the device 800 acts as the client device 110, the device 800 may further comprise an image capturing module (not shown) capable of capturing information in the surroundings, such as a two-dimensional code. The controller 810 may cooperate with other elements in the device 800 to implement the method 400 as described above with reference to FIG. 4. When the device 800 acts as the authentication proxy 130, the controller 810 may cooperate with other elements in the device 800 to implement the method 500 as described above with reference to FIG. 5. All operations and features described above with reference to FIGS. 1 to 7 are likewise applicable to the device 800 and have similar effects. For the purpose of simplification, the details will be omitted.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method as described above with reference to any of FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

I claim:

1. A method implemented at a client device, comprising:
    reading a digital tag associated with a service to be accessed, the digital tag being encoded with an identifier associated with a service provider that provides the service;
    decoding the digital tag to obtain the identifier;
    determining an authentication proxy associated with the service provider, wherein the associated authentication proxy comprises a server external to the client device;
    retrieving a first address of the associated authentication proxy that is predefined in local storage in the client device; and
    sending, to the associated authentication proxy based on the first address retrieved from the local storage, the identifier and a first request for an authentication of an identity of a user associated with the client device.

2. The method of claim 1, wherein the digital tag is further encoded with first identification information of one or more candidate authentication proxies associated with the service provider, and determining the associated authentication proxy comprises:
    decoding the digital tag to obtain the first identification information; and
    selecting the associated authentication proxy from the one or more candidate authentication proxies.

3. The method of claim 2, further comprising:
    determining a predefined authentication proxy to be associated with the service provider, wherein selecting the associated authentication proxy comprises:
        determining whether the predefined authentication proxy is included in the one or more candidate authentication proxies, and
        in response to the inclusion of the predefined authentication proxy, selecting the predefined authentication proxy as the associated authentication proxy.

4. The method of claim 2, wherein selecting the associated authentication proxy comprises:
    searching the local storage for a first association between an address of one of the one or more candidate authentication proxies and the first identification information of the candidate authentication proxy; and
    in response to finding the first association, selecting the candidate authentication proxy as the associated authentication proxy.

5. The method of claim 2, wherein:
    decoding the digital tag to obtain the first identification information comprises decoding the digital tag to obtain the one or more candidate authentication proxies; and
    addresses of the one or more candidate authentication proxies are retrieved from the local storage.

6. The method of claim 1, wherein the digital tag is further encoded with second identification information of one or more candidate identity providers associated with the service provider, and the method further comprises:
    decoding the digital tag to obtain the second identification information; and
    sending the second identification information to the associated authentication proxy.

7. The method of claim 1, further comprising:
    determining a predefined identity provider from the local storage to be associated with the service provider; and
    sending an indication of the predefined identity provider to the associated authentication proxy.

8. The method of claim 7, wherein sending the indication of the predefined identity provider comprises:
    retrieving a second address of the predefined identity provider that is predefined in the local storage in the client device; and
    sending the second address of the predefined identity provider to the associated authentication proxy.

9. The method of claim 1, further comprising:
    receiving, from the associated authentication proxy, a third address of an identity provider associated with the service provider; and
    sending, based on the third address and to the identify provider, the identity of the user for the authentication.

10. The method of claim 9, wherein:
    the identifier associated with the service provider comprises an identifier of a login interface provided by the service provider; and
    when authentication of the user is passed in the associated identity provider, the method further comprises presenting content requested by the user instead of the login interface and without receiving input from the user on the login interface.

11. The method of claim 1, wherein:
the identifier associated with the service provider comprises a Uniform Resource Locator (URL) of a login interface provided by the service provider.

12. A method implemented at an authentication proxy, comprising:
receiving, from a client device external to the authentication proxy, an identifier associated with a service provider that provides a service to be accessed, and a first request for an authentication of an identity of a user associated with the client device, wherein a first address of the authentication proxy is predefined in local storage in the client device, and the identifier and the first request are sent from the client device to the authentication proxy based on the first address retrieved from the local storage in the client device;
determining, in response to the first request from the client device, an identity provider associated with the service provider that is configured to assist the service provider in the authentication of the identity of the user, and to provide an authentication result to the service provider;
retrieving a second address of the associated identity provider that is predefined in local storage in the authentication proxy; and
sending, to the associated identity provider based on the second address retrieved from the local storage in the authentication proxy, the identifier and a second request for the authentication of the identity of the user.

13. The method of claim 12, wherein determining the associated identity provider comprises:
receiving, from the client device, second identification information of one or more candidate identity providers associated with the service provider; and
selecting the associated identity provider from the one or more candidate identity providers.

14. The method of claim 13, wherein selecting the associated identity provider comprises:
receiving, from the client device, an indication of a predefined identity provider to be associated with the service provider; and
selecting the associated identity provider from the one or more candidate identity providers based on the indication of the predefined identity provider.

15. The method of claim 14, wherein receiving the indication of the predefined identity provider comprises:
receiving an address of the predefined identity provider from the client device, and wherein selecting the associated identity provider comprises:
searching a second local storage for a second association between the address of the predefined identity provider and the second identification information of the one or more candidate identity providers, and
in response to finding the second association, selecting the predefined identity provider as the associated identity provider.

16. The method of claim 15, further comprising:
returning an error message to the client device when the second association is not found.

17. The method of claim 12, further comprising:
sending, to the client device, the second address of the associated identity provider to redirect the client device to the associated identity provider.

18. The method of claim 17, wherein sending the second address of the associated identity provider to redirect the client device to the associated identity provider comprises:
sending, to the client device, an HTTP response with a redirection header pointing to the second address of the associated identity provider.

19. A client device, comprising:
at least one processor and memory;
the at least one processor causes the client device to:
read a digital tag associated with a service to be accessed, the digital tag being encoded with an identifier associated with a service provider that provides the service;
decode the digital tag to obtain the identifier;
determine an authentication proxy associated with the service provider, wherein the associated authentication proxy comprises a server external to the client device;
retrieve an address of the associated authentication proxy that is predefined in the memory; and
send, to the associated authentication proxy based on the address retrieved from the memory, the identifier and a request for an authentication of an identity of a user associated with the client device.

20. The client device of claim 19, wherein the digital tag is further encoded with first identification information of one or more candidate authentication proxies associated with the service provider, and the at least one processor causes the client device to:
decode the digital tag to obtain the first identification information; and
select the associated authentication proxy from the one or more candidate authentication proxies.

* * * * *